(12) United States Patent
An et al.

(10) Patent No.: US 7,601,459 B2
(45) Date of Patent: Oct. 13, 2009

(54) FUEL CELL SYSTEM

(75) Inventors: Seong-Jin An, Suwon-si (KR);
Hyoung-Juhn Kim, Suwon-si (KR);
Yeong-Chan Eun, Suwon-si (KR);
Sung-Yong Cho, Suwon-si (KR);
Ho-Jin Kweon, Suwon-si (KR);
Hae-Kwon Yoon, Suwon-si (KR)

(73) Assignee: Samsung SDI Co., Ltd., Suwon (KR)

( * ) Notice: Subject to any disclaimer, the term of this patent is extended or adjusted under 35 U.S.C. 154(b) by 0 days.

(21) Appl. No.: 11/109,754

(22) Filed: Apr. 20, 2005

(65) Prior Publication Data

US 2005/0238939 A1 Oct. 27, 2005

(30) Foreign Application Priority Data

Apr. 21, 2004 (KR) .................. 10-2004-0027411

(51) Int. Cl.
*H01M 8/02* (2006.01)
(52) U.S. Cl. .................................. 429/163
(58) Field of Classification Search ............ 429/12, 429/30, 34, 35, 37, 38, 36, 163, 26, 148, 429/151, 153
See application file for complete search history.

(56) References Cited

U.S. PATENT DOCUMENTS

| | | | |
|---|---|---|---|
| 6,080,500 A * | 6/2000 | Fuju et al. .................. | 429/12 |
| 6,689,499 B2 * | 2/2004 | Gillett et al. ................ | 429/13 |
| 6,896,987 B2 * | 5/2005 | Bunker et al. ............... | 429/26 |
| 2003/0031904 A1 * | 2/2003 | Haltiner, Jr. ................ | 429/26 |
| 2004/0146772 A1 * | 7/2004 | Miyao et al. ................ | 429/38 |
| 2005/0014054 A1 * | 1/2005 | Champion ................... | 429/34 |
| 2005/0026026 A1 * | 2/2005 | Yen et al. .................... | 429/36 |
| 2005/0037247 A1 * | 2/2005 | Takahashi .................... | 429/23 |
| 2005/0136307 A1 * | 6/2005 | Tsunoda ...................... | 429/26 |
| 2005/0142426 A1 * | 6/2005 | Danzer et al. ............... | 429/38 |
| 2007/0148503 A1 * | 6/2007 | Okazaki ...................... | 429/13 |

FOREIGN PATENT DOCUMENTS

| | | |
|---|---|---|
| CN | 1233081 | 10/1999 |
| CN | 1349668 | 5/2002 |
| JP | 61-133574 | 6/1986 |
| JP | 08-078044 | 3/1996 |
| JP | 2002-190313 | 7/2002 |
| JP | 2002-305006 | 10/2002 |
| JP | 2002-367652 | 12/2002 |
| JP | 2004-047495 | 2/2004 |

* cited by examiner

*Primary Examiner*—Patrick Ryan
*Assistant Examiner*—Monique Wills
(74) *Attorney, Agent, or Firm*—H.C. Park & Associates, PLC

(57) ABSTRACT

The present invention provides a fuel cell system that includes a stack that has at least one electricity generating unit that generates electricity through a reaction between hydrogen and oxygen, a fuel supplier that provides fuel containing hydrogen to the electricity generating unit, an air supplier that provides air to the electricity generating unit, and an insulating unit that surrounds exposed outer surfaces of the stack.

9 Claims, 5 Drawing Sheets

FUEL CELL SYSTEM

CROSS REFERENCE TO RELATED APPLICATION

This application claims priority to and the benefit of Korean Patent Application No. 10-2004-0027411 filed in the Korean Intellectual Property Office on Apr. 21, 2004, the entire content of which is incorporated herein by reference.

FIELD OF THE INVENTION

The present invention relates to a fuel cell system. In particular, it relates to a fuel cell system that has a stack insulation structure.

BACKGROUND OF THE INVENTION

Generally, a fuel cell is an electric power generating system that converts chemical reaction energy between hydrogen and oxygen contained in a hydrocarbon-based fuel such as methanol and natural gas, directly into electrical energy. The fuel cell can use the electricity generated from the chemical reaction between hydrogen and oxygen without a combustion process or heat, which is a by-product of the reaction.

Fuel cells are classified into various groups including a Phosphoric Acid Fuel Cell (PAFC) that operates at around 150 to 200° C., a Molten Carbonate Fuel Cell (MCFC) that operates at a high temperature of between 600 and 700° C., a Solid Oxide Fuel Cell (SOFC) that operates at a very high temperature of over 1000° C., and a Polymer Electrolyte Membrane Fuel Cell (PEMFC) and an Alkaline Fuel Cell (AFC) that operate at between room temperature and a temperature no higher than 100° C. These fuel cells all operate on the same fundamental principles, but the types of fuel, operating temperature, catalyst, and electrolyte that are used differ from each other.

The recently developed PEMFC has an excellent output characteristic and fast starting and response characteristics as well as a low operating temperature, when compared to other types of fuel cells. It also has an advantage in that it can be applied to a wide range of applications such as a distributed power source for houses and public buildings, as a small power source for electronic devices, and as a mobile power source for a car. The PEMFC uses hydrogen obtained by reforming methanol, ethanol, or natural gas as a fuel.

The basic structure of a system for a PEMFC comprises a fuel cell body called a stack, as well as a fuel tank and a fuel pump that supplies fuel from the fuel tank to the stack. It further requires a reformer that generates converts the fuel into hydrogen while supplying the fuel stored in the fuel tank to the stack.

The PEMFC generates electricity by supplying the fuel stored in the fuel tank to the reformer using the fuel pump, generating hydrogen gas in the reformer, and reacting the hydrogen gas with oxygen in the stack.

In addition, the fuel cell may have a Direct Oxidation Fuel Cell (DOFC) scheme, such as a Direct Methanol Fuel Cell (DMFC) that can directly supply liquid methanol fuel to the stack. Unlike the PEMFC, the fuel cell of the DOFC scheme does not require the reformer.

FIG. 5 is a cross-sectional view that shows a stack that is used in a conventional fuel cell system. As shown, the stack 10, which generates the electricity in the fuel cell, includes numerous unit cells that are stacked with each other. Each unit cell comprises a membrane-electrode assembly (MEA) 11 and separators 13, 13', which are also referred to as bipolar plates.

The MEA 11 comprises an anode and a cathode that are each positioned on a side with an electrolyte membrane interposed therebetween. The separators 13, 13' form a fuel path 15 and an oxidizer path 17 on the surfaces where they are attached to the anode and cathode, respectively. Thus, the separators 13 supply hydrogen gas to the anode through the fuel path 15 and the separators 13' supply air containing oxygen to the cathode through the oxidizer path 17.

As a result, the hydrogen gas is oxidized at the anode and the oxygen is reduced at the cathode. The protons that are generated from the hydrogen oxidation reaction move to the cathode through the electrolyte membrane while electrons move to the cathode through an external wire to thereby generate electricity. Water is generated as a byproduct from the reduction reaction of protons, electrons, and oxygen at the cathode.

The stack 10 of the conventional fuel cell system is configured to expose unit cells in the region where the stack 10 is set up. This may cause water to condense on the surface of the unit cells, that is, on the external surface of the separators 13, 13', due to a temperature gradient in the space. If a conductive material contacts the external surface of the separators, an electrical short may occur. In other words, although the separators 13, 13' on both sides of the membrane-electrode assembly 11 are supposed to be insulated, a short may occur between the separators 13, 13' due to the condensed water and the conductive material. At the very least, such a short circuit may block electricity from efficiently reaching the load and may cause damage to the entire fuel cell system. This may also result in a more harmful situation such as a fire or a fatal accident.

SUMMARY OF THE INVENTION

The present invention provides a fuel cell system that can prevent an electrical short circuit between separators.

Additional features of the invention will be set forth in the description which follows, and in part will be apparent from the description, or may be learned by practice of the invention.

The present invention discloses a fuel cell system comprising a stack that has at least one electricity generating unit for generating electricity through a reaction between hydrogen and oxygen. It also includes a fuel supplier that provides fuel containing hydrogen to the electricity generating unit, an air supplier that provides air to the electricity generating unit, and an insulating unit that surrounds the exposed outer surfaces of the stack.

The present invention also discloses a fuel cell system that includes a stack that has at least one electricity generating unit that generates electrical energy through a reaction between hydrogen and oxygen. It also includes a fuel supplier that provides fuel containing hydrogen to the electricity generating unit, an air supplier that provides air to the electricity generating unit, and an insulating unit that has an internal space for housing the stack.

It is to be understood that both the foregoing general description and the following detailed description are exemplary and explanatory and are intended to provide further explanation of the invention as claimed.

DETAILED DESCRIPTION OF THE INVENTION

Figure 1:
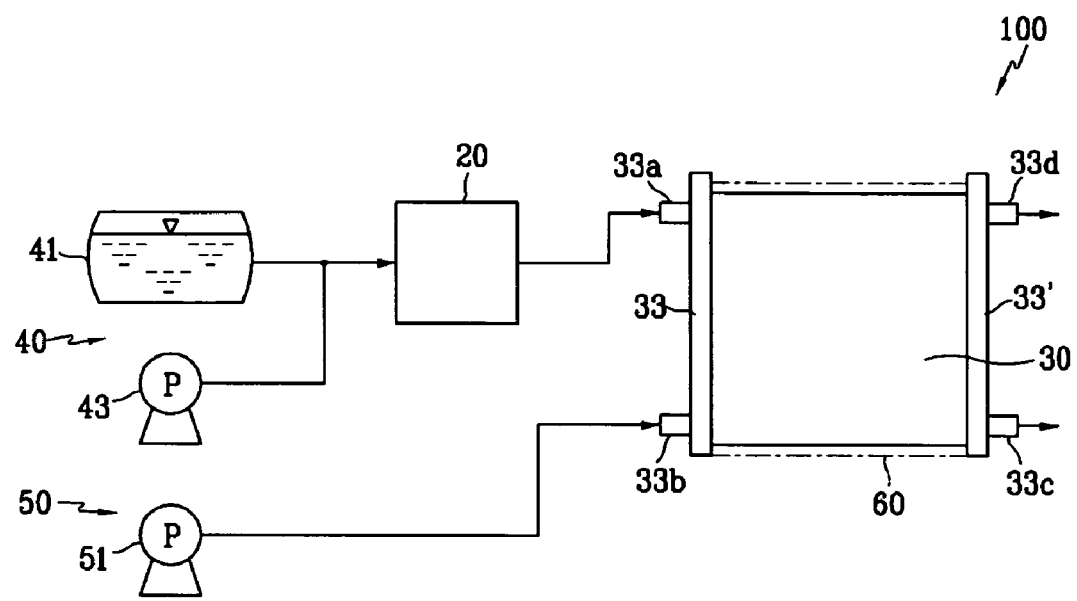
FIG. 1 is a view that shows a fuel cell system in accordance with a first exemplary embodiment of the present invention.

FIG. 1 is a diagram that shows a fuel cell system according to a first exemplary embodiment of the present invention. As shown in FIG. 1, the fuel cell system 100 may have a PEMFC configuration that generates a reformed gas comprising hydrogen gas by reforming fuel containing hydrogen, and then generates electricity by reacting the hydrogen with oxygen.

The fuel cell system 100 basically comprises a reformer 20 for generating a reformed gas, a stack 30 for generating electricity, a fuel supplier 40 for providing the fuel to the reformer 20, and an air supplier 50 for providing air to the stack 30.

In the fuel cell system 100 of the present invention, the fuel that is required to generate electricity includes hydrocarbon-based fuels such as methanol, ethanol, and natural gas, and further includes water and oxygen.

As mentioned before, the fuel cell system 100 of the present invention can generate electricity through a reaction between the reformed gas that is generated in the reformer 20 and air in the stack 30. Alternatively, the fuel cell system 100 may generate electricity by reacting oxygen gas that is stored separately with the reformed gas in the stack 30. However, the present invention will be described hereafter using first case where air is used as a source of oxygen.

Also, the fuel cell system 100 of the present invention may adopt a DOFC scheme in which electricity is generated by directly supplying liquid-phase fuel containing hydrogen to the stack 30. This method differs from the PEMFC-type fuel cell in that a DOFC-type fuel cell does not require a reformer 20. Hereinafter, the present invention will be described using an example of a fuel cell system 100 according to the PEMFC method, but it is not limited to it.

The reformer 20 is a device that not only converts liquid-phase fuel into a hydrogen-rich reformed gas, but it also lowers the concentration of carbon monoxide in the reformed gas. Conventionally, the reformer 20 comprises a reforming unit for generating a hydrogen-rich reformed gas from the liquid-phase fuel, and a carbon monoxide reducing unit for decreasing the concentration of carbon monoxide in the reformed gas. The reforming unit converts the fuel into the hydrogen-rich reformed gas through a steam reforming (SR) reaction or through a catalytic reaction such as partial oxidation (PO) and autothermal reforming reaction (ATR). The carbon monoxide reducing unit reduces the concentration of carbon monoxide in the reformed gas through a water gas shift method, a catalytic reaction, such as preferential oxidation, or a hydrogen purification method using a membrane separation.

The fuel supplier 40 is connected to the reformer 20 and it includes a fuel tank 41 that stores liquid-phase fuel and a fuel pump 43 that is connected with the fuel tank 41. The air supplier 50 is connected with the stack 30 and it includes an air pump 51 that sucks in air.

Figure 2:
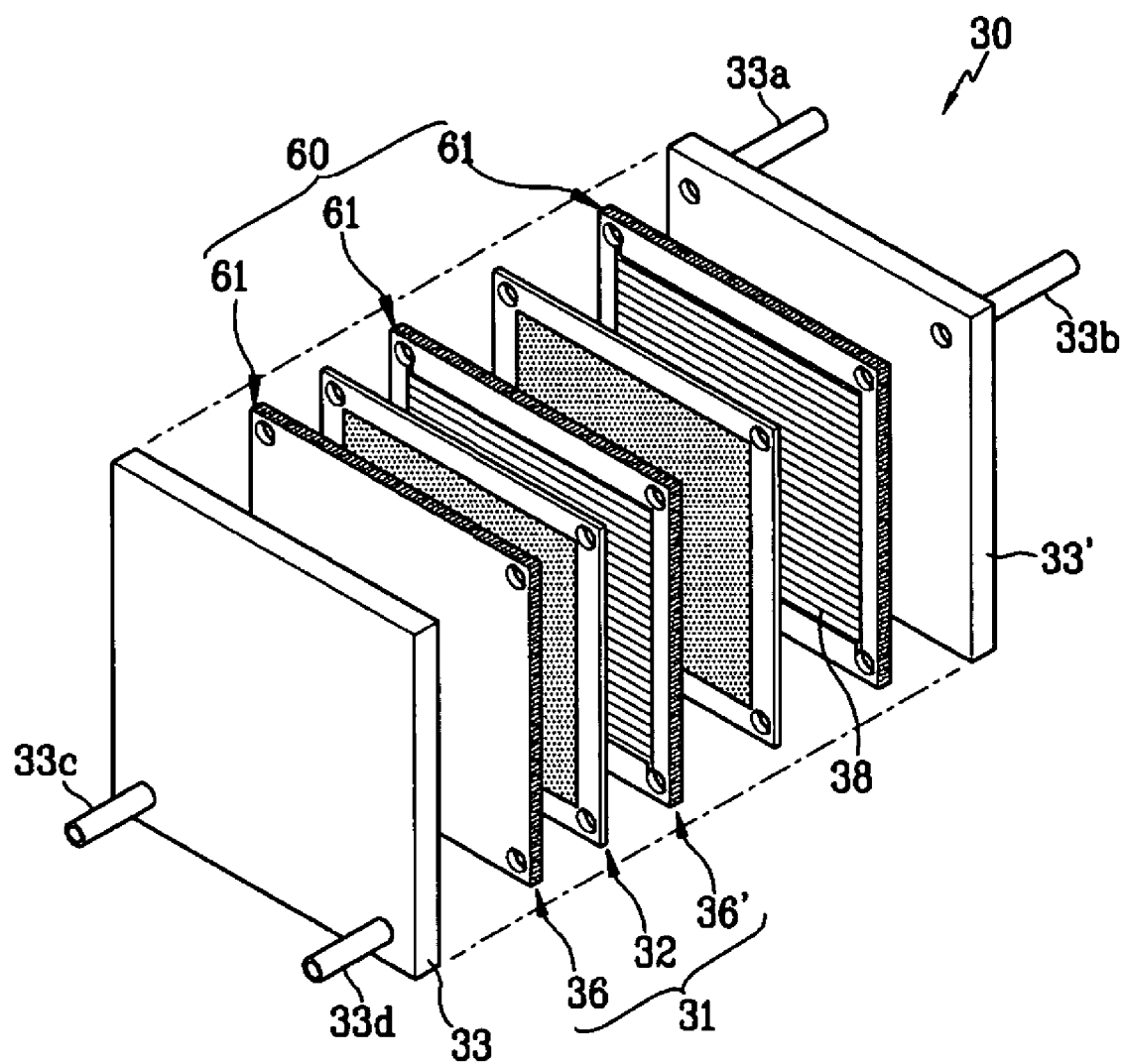
FIG. 2 is an exploded perspective view that illustrates a stack of FIG. 1.
Figure 3:
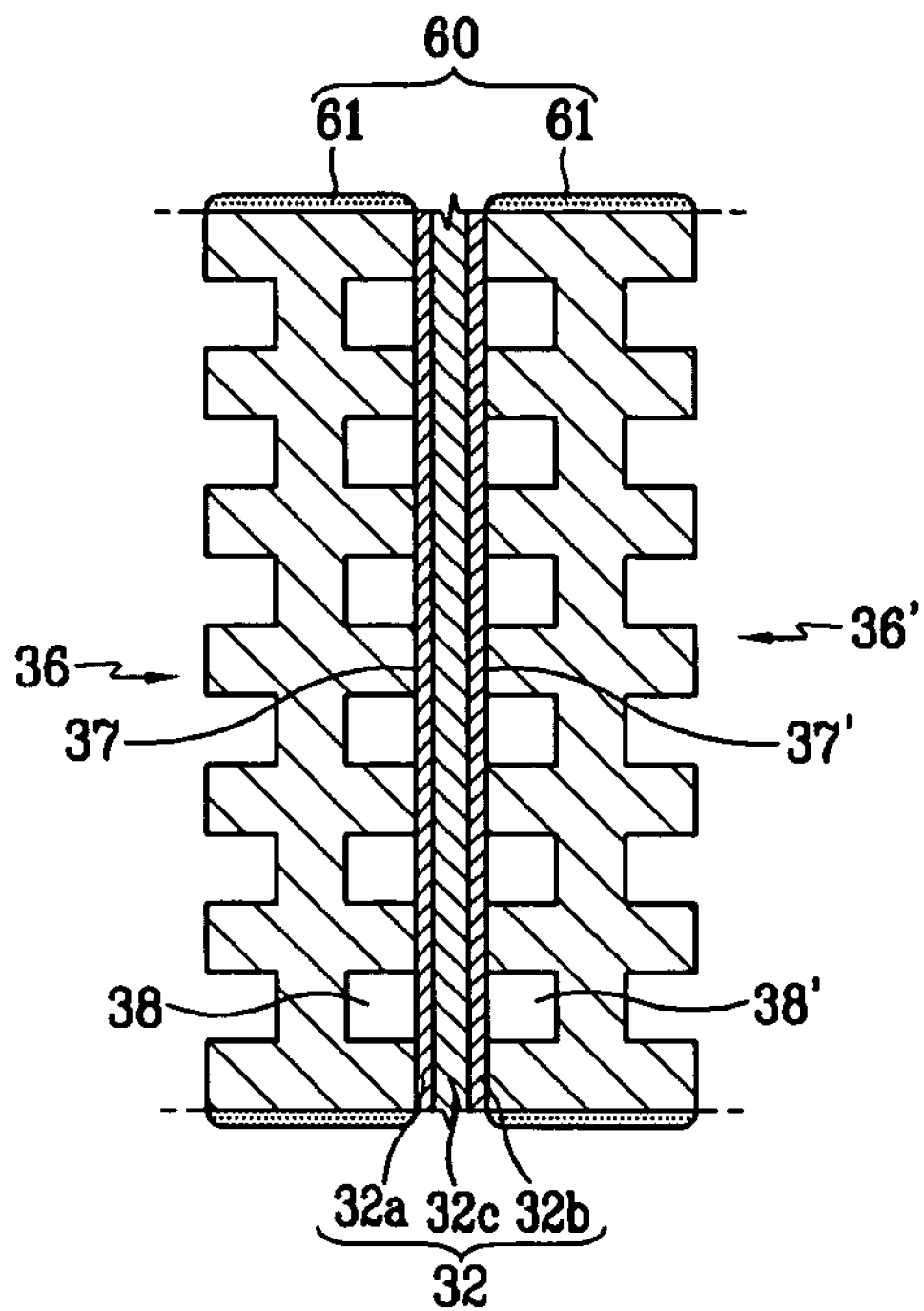
FIG. 3 is a partial cross-sectional view that describes the assembly of a membrane-electrode assembly and separators of FIG. 2.

FIG. 2 is an exploded perspective view that illustrates the stack of FIG. 1, and FIG. 3 is a partial cross-sectional view that describes a membrane-electrode assembly and separators of FIG. 2. Referring to FIG. 1, FIG. 2 and FIG. 3, the stack 30 of the fuel cell system 100 of the present invention, is formed by stacking up a plurality of electricity generating units 31. Each of the electricity generating units 31 generates electricity through an oxidation/reduction reaction between the reformed gas obtained from the reformer 20 and oxygen.

Specifically, an electricity generating unit 31 is a unit cell that is formed by placing the separators 36, 36' on either side of the membrane-electrode assembly 32. A plurality of unit cells are stacked up to form the stack 30.

The outermost edges of the stack 30 include end plates 33, 33' that are positioned to fasten in the electricity generating units 31.

The membrane-electrode assembly 32 includes an anode 32a and a cathode 32b on each side and an electrolyte membrane 32c that is placed in between the two electrodes 32a and 32b. The anode 32a oxidizes the reformed gas and releases electrons that are generated during the oxidation. The flow of the electrons generates an electric current and moves protons to the cathode 32b through the electrolyte membrane 32c through ion exchange. The cathode 32b combines the protons with oxygen and produces water.

The separators 36, 36' form a hydrogen path 38 that supplies the reformed gas to the anode 32a on its first side 37 that contacts the anode 32a of the membrane-electrode assembly 32. They also form an air path 38' that supplies air to the cathode 32b on its second side 37' that contacts the cathode 32b of the membrane-electrode assembly 32.

The end plate 33' includes a first injection unit 33a for providing the reformed gas to the hydrogen path 38 of the separator 36 and a second injection unit 33b for providing air to the air path 38' of the separator 36'. End plate 33 includes a first ejection unit 33c for discharging fuel left behind after the reaction at the anode 32a and a second ejection unit 33d for discharging air left behind after the reaction at the cathode 32b.

In the fuel cell system 100 described above where the reformed gas is supplied to the anode 32a of the membrane-electrode assembly 32 through the hydrogen path 38 of the separator 36, and air is supplied to the cathode 32b of the membrane-electrode assembly 32 through the air path 38' of the separator 36', electricity is generated in the membrane-electrode assembly 32 through the oxidation/reduction reaction between the reformed gas and oxygen.

The fuel cell system 100 may fail to efficiently provide electricity to a load or may cause accidents such as a fire, by causing an electrical short between the separators 36, 36' when water is condensed on the outer surface of the electricity generating units 31. This condensation results from a temperature change in the surroundings of the stack 30 or when a conductive material contacts the surface of the electricity.

To overcome the problem, the fuel cell system 100 according to an exemplary embodiment of the present invention comprises an insulating unit 60 that encloses the outer surface of the stack 30. The insulating unit 60 prevents leakage of the electricity that is generated in the electricity generating units 31.

The insulating unit 60 forms an insulation film 61 on the exposed surfaces of the MEA 32, except for regions where the separators 36, 36' meet the membrane-electrode assembly 32. Specifically, the insulation film 61 may be formed on the exposed surfaces of the separators 36, 36' except for the first side 37 where the membrane-electrode assembly 32 contacts the anode 32a, and the second side 37' where the membrane-electrode assembly 32 contacts the cathode 32b. In this case, the insulation film 61 may coat the exposed surfaces with a liquid-phase insulating material. The coating may be performed by a spraying, brushing, or dipping method that is followed by a drying process.

The insulating material may include synthetic resin and synthetic rubber, for example. Specifically, the insulating material may include ordinary synthetic resins, such as phenol resin, polyurethane, polyester resin, polytetrafluoroethylene (PTFE), polyimide, polyamide, acryl, urea/melamine resin, and silicone resin, and varnish-based insulating materials such as insulating varnish.

When the end plates 33, 33' of the stack 30 are conductive, the insulation film 61 is formed on the side of the separators 36, 36' that contacts each of the end plates 33, 33' at the outermost side of the electricity generating unit 31. Alternatively, the insulation film 61 can be formed on the exposed surfaces of the end plates 33, 33', except on the regions that contact the separators 36, 36'.

The present invention also presents an alternative method of attaching an insulating tape formed of an insulating material such as a synthetic resin, synthetic fiber, and synthetic rubber to the exposed surfaces of the stack 30.

The insulating unit 60 may be formed on each electricity generating unit 31 that forms the stack 30, or it may be formed after the stack 30 is assembled.

Since the fuel cell system 100 includes the insulation film 61 for insulating the electricity generated in the electricity generating units 31, it can prevent an electrical short between the separators 36, 36' by condensation of water in the outer surface of the electricity generating units 31.

Figure 4:
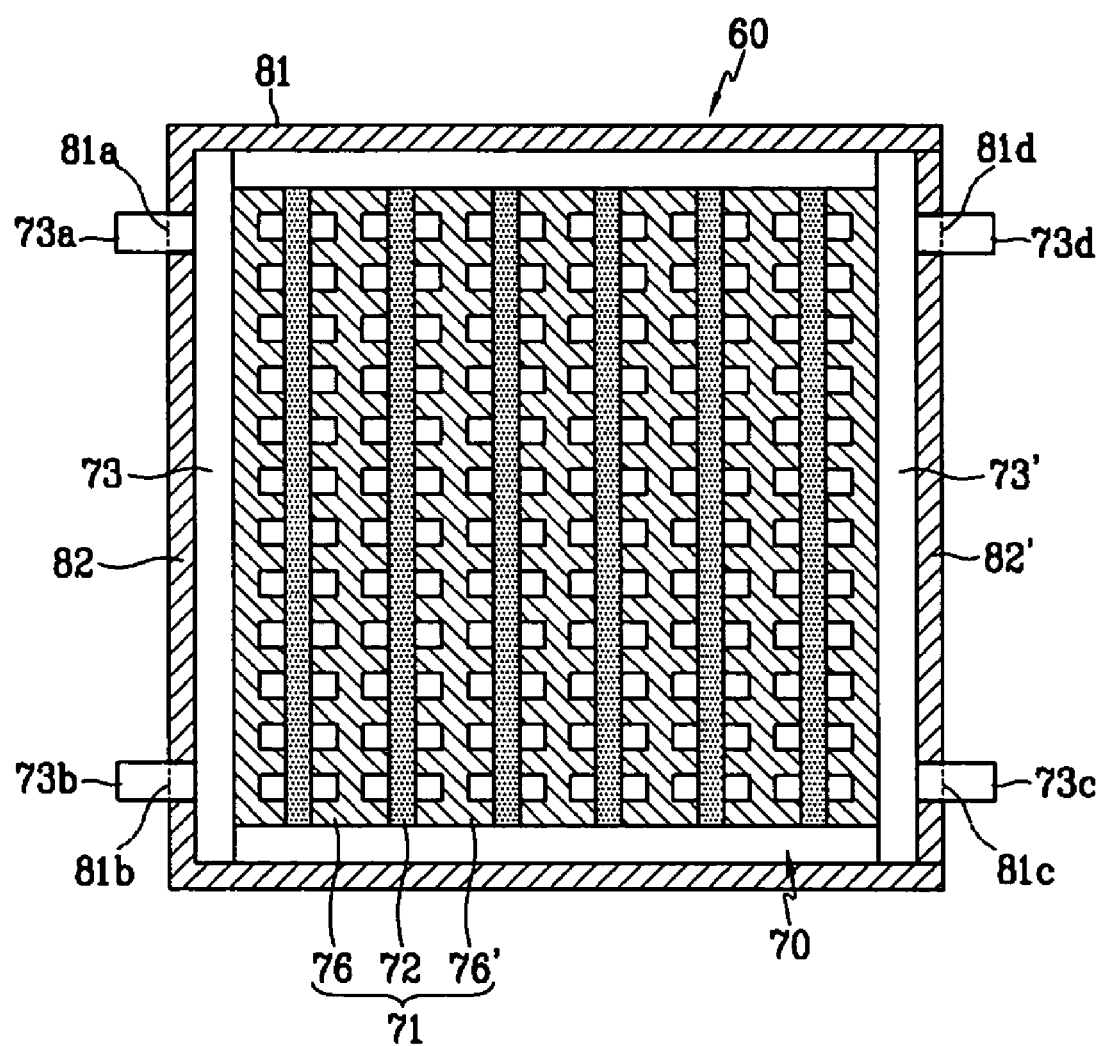
FIG. 4 is a cross-sectional view that describes a stack used in a fuel cell system in accordance with a second embodiment of the present invention.
Figure 5:
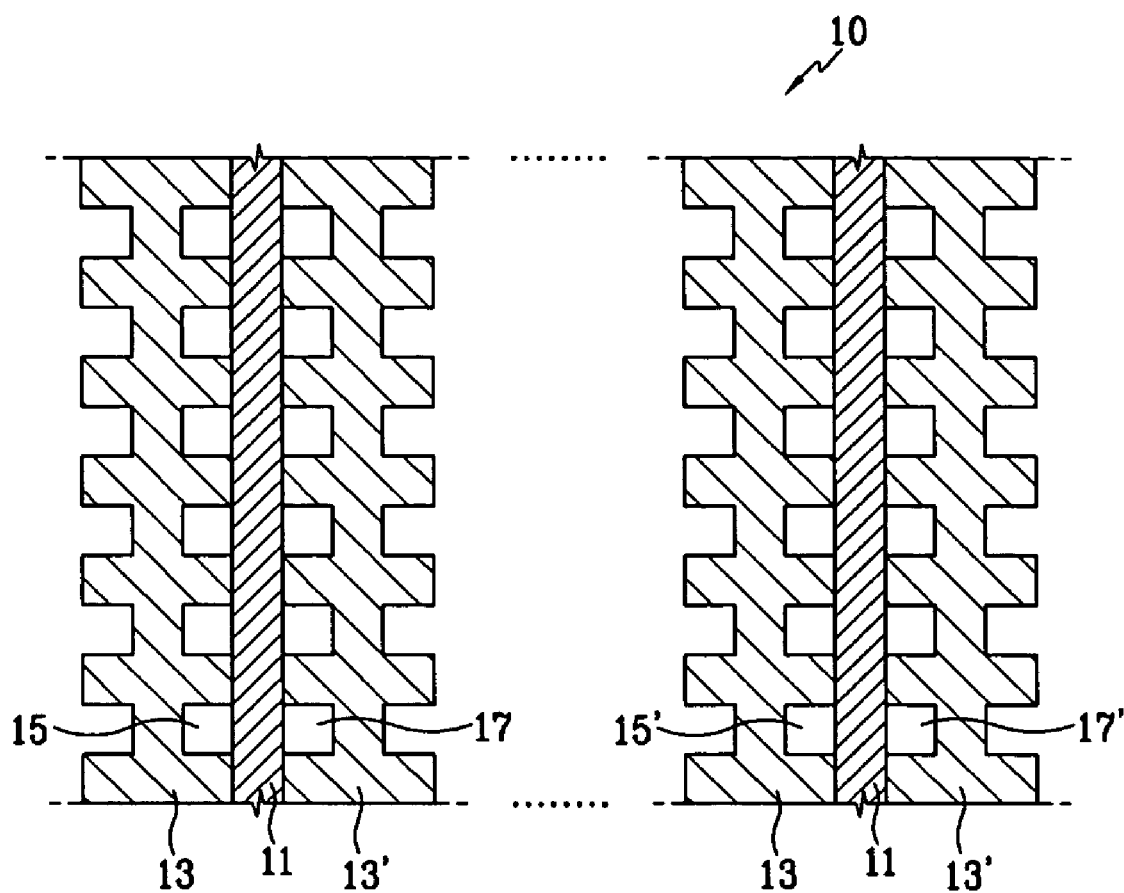
FIG. 5 is a cross-sectional view that shows a stack used in a conventional fuel cell system.

FIG. 4 is a cross-sectional view that describes a stack that is used in a fuel cell system in a second exemplary embodiment of the present invention. In the second embodiment, a stack 70 of a fuel cell system has an insulating unit 60 that is similar to the insulating unit 60 of the first embodiment, but it further includes an insulation case 81 that surrounds the entire stack 70. This insulation case insulates electricity that is generated in the electricity generating units 71.

The insulation case 81 has an airtight case with an internal space for housing the entire stack 70 including end plates 73, 73'. The insulation case 81 may have a shape of a hexahedron where one side of the hexahedron may be an opening/shutting door. Thus, the stack 70 may be placed into the internal space by opening the opening/shutting door. Therefore, it is preferable to form sides 82, 82' among the hexahedral sides, which contact at least one of the end plates 73, 73' to be optionally separated.

The insulation case 81 is provided with openings 81a to 81d that are coupled with first and second injection units 73a and 73b and first and second ejection units 73c and 73d of the end plates 73, 73'. The openings 81a to 81d may be formed in the sides that contact with the end plates 73, 73' of the stack 70.

The present embodiment is not limited to a structure where the insulation case 81 houses the entire stack 70, and it may alternatively have a structure where the insulation case 81 houses the entire electricity generating units 71 except for the end plates 73, 73'. For this configuration, it is preferable that the end plates 73, 73' are nonconductors. If the end plates 73, 73' are conductive, an insulating unit may be interposed between the separators 76 and the end plates 73, 73' in the outermost part of the electricity generating units 71.

The insulation case 81 may be formed of a material that can insulate electricity, including, but not limited to inorganic materials such as asbestos, marble, and sulfur, ceramic materials such as steatite, glass, and porcelain, glass materials such as quartz glass, soda glass, and lead glass, fiber materials such as wood, paper, cotton yarn, silk fabric, hemp yarn, polyester, and polyethylene, resin materials such as polytetrafluoroethylene, polyimide, polyamide, polystyrene, polypropylene, polyethylene, polyvinyl chloride, and nylon, rubber materials such as natural rubber, ebonite, isobutylene isoprene rubber, chloroprene rubber, and silicone rubber, and varnish-based materials such as varnish cross, varnish paper, and synthetic resin-based varnish. The insulation case may be formed in a known molding method according to its material.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A fuel cell system, comprising:
a plurality of electricity generating units comprising a membrane-electrode assembly, a separator, and end plates for fastening the electricity generating units;
a fuel supplier;
an oxidant supplier; and
an electric insulating unit comprising an airtight internal space for housing the electricity generating units,
wherein the electric insulating unit comprises an electric insulation case that surrounds the entire electricity generating units.

2. The fuel cell system of claim 1, wherein the electric insulation case further comprises a plurality of openings for injecting fuel and an oxidant into the electricity generating units, and for discharging fuel, oxidant, and water that remain after the reaction.

3. The fuel cell system of claim 1, wherein the electric insulation case further comprises at least one door for placing the electricity generating units into the internal space.

4. A fuel cell, comprising:
an electricity generating unit comprising a membrane-electrode assembly, a separator, and an end plate;
a fuel supplier;
an oxidant supplier; and
an electric insulating unit formed on an exposed outer surface of the separator.

5. The fuel cell of claim 4, wherein a reformer for generating hydrogen gas by converting the fuel supplied from the fuel supplier connects the fuel supplier and the electricity generating unit.

6. The fuel cell of claim 4, wherein the fuel cell system is a polymer electrolyte membrane fuel cell.

7. The fuel cell of claim 4, wherein the fuel cell system is a direct oxidation fuel cell.

8. The fuel cell system of claim 1, wherein the electric insulating unit is formed of an electric insulating material selected from the group consisting of inorganic materials, ceramic materials, glass materials, fiber materials, resin materials, rubber materials, varnish-based materials, and combinations thereof.

9. The fuel cell of claim 4, wherein the electric insulating unit is formed directly on the exposed outer surface of the separator.

* * * * *